(12) United States Patent
Bennett et al.

(10) Patent No.: US 8,483,067 B2
(45) Date of Patent: *Jul. 9, 2013

(54) CLIENT QOS BASED CONNECTION SESSION JOGGING

(75) Inventors: James Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/273,004

(22) Filed: Oct. 13, 2011

(65) Prior Publication Data
US 2012/0033548 A1    Feb. 9, 2012

Related U.S. Application Data

(63) Continuation of application No. 12/323,409, filed on Nov. 25, 2008, now Pat. No. 8,040,809.

(51) Int. Cl.
*H04L 1/00*    (2006.01)
(52) U.S. Cl.
USPC ........................................................ 370/238
(58) Field of Classification Search
USPC ............... 370/230, 235, 237–238, 328–339, 370/395.2–395.21, 400–401
See application file for complete search history.

(56) References Cited

U.S. PATENT DOCUMENTS

| | | | |
|---|---|---|---|
| 5,903,558 A | 5/1999 | Jones et al. | 370/351 |
| 5,991,292 A | 11/1999 | Focsaneanu et al. | 370/352 |
| 6,141,339 A | 10/2000 | Kaplan et al. | 370/395.61 |
| 6,574,216 B1 | 6/2003 | Farris et al. | 370/352 |
| 6,690,651 B1 | 2/2004 | Lamarque, III et al. | 370/252 |
| 6,934,258 B1 | 8/2005 | Smith et al. | 370/238 |
| 7,464,170 B2 | 12/2008 | Yokoyama | 709/231 |
| 8,040,809 B2 | 10/2011 | Bennett et al. | 370/238 |
| 2002/0065922 A1 | 5/2002 | Shastri | 709/227 |
| 2006/0025149 A1 | 2/2006 | Karaogus et al. | 455/452.2 |
| 2007/0025254 A1 | 2/2007 | Raciborski et al. | 370/235 |
| 2009/0323632 A1 | 12/2009 | Nix | 370/331 |

FOREIGN PATENT DOCUMENTS

| | | |
|---|---|---|
| EP | 01 826 992 | 8/2007 |
| EP | 02 018 021 | 1/2009 |

OTHER PUBLICATIONS

European Search Report for European Patent Application Serial No. 09014368.6-2416, dated Jan. 4, 2010.
EP Result of Consultation, Application No. 09 014 368.6-2414, Ref. No. BP329366EP, dated Jan. 17, 2011, 4 pages.
End-To-End QoS Control Architecture and Route Selection Method for IP Networks dated Apr. 17, 2006, 12 pages.

*Primary Examiner* — Frank Duong
(74) *Attorney, Agent, or Firm* — Brinks Hofer Gilson & Lione

(57) ABSTRACT

A communication device, comprising communication interface circuitry, processing circuitry coupled to the communication interface circuitry, and a user interface coupled to the processing circuitry, interacts with a remote device in a communication infrastructure that supports multiple possible communication pathways such as first and second communication pathways between the communication device and the remote device. A data exchange relating to at least a voice delivery service is initiated by the processing circuitry over the first communication pathway. A jog input indication is generated during the data exchange via the user interface in response to a user input, and delivered to the processing circuitry. The jog input indication is indicative of dissatisfaction of the user with ongoing performance of the first communication pathway in the data exchange. In response to the jog input indication received, the processing circuitry switches the data exchange from the first communication pathway to the second communication pathway.

20 Claims, 8 Drawing Sheets

CLIENT QOS BASED CONNECTION SESSION JOGGING

CROSS-REFERENCE TO RELATED APPLICATIONS/INCORPORATION BY REFERENCE

This application is a continuation of U.S. application Ser. No. 12/323,409 filed on Nov. 25, 2008. The above stated application is incorporated herein by reference in their entirety.

FIELD OF THE INVENTION

Certain embodiments of the invention relate to communication systems. More specifically, certain embodiments of the invention relate to a method and system for a client QoS based connection session jogging procedure.

BACKGROUND OF THE INVENTION

Nowadays, in the emerging ubiquitous network environment, the IP-based core network connects with a wide variety of wired and/or wireless access networks to provide access to end users. Such access has lead to an accompanying increase in delivering a variety of services such as live video and audio to end users. The tendency in telecommunication industry is towards providing high-quality content for various multimedia services. Quality of Service (QoS) is designed to meet the needs for various kinds of applications and provide service quality of different kinds, such as, reducing message loss rate, decreasing message transport delay and delay jitter. To this end, QoS employs different technologies like stream categorizing, traffic monitoring, network congestion management and network congestion avoidance.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a client QoS based connection session jogging, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
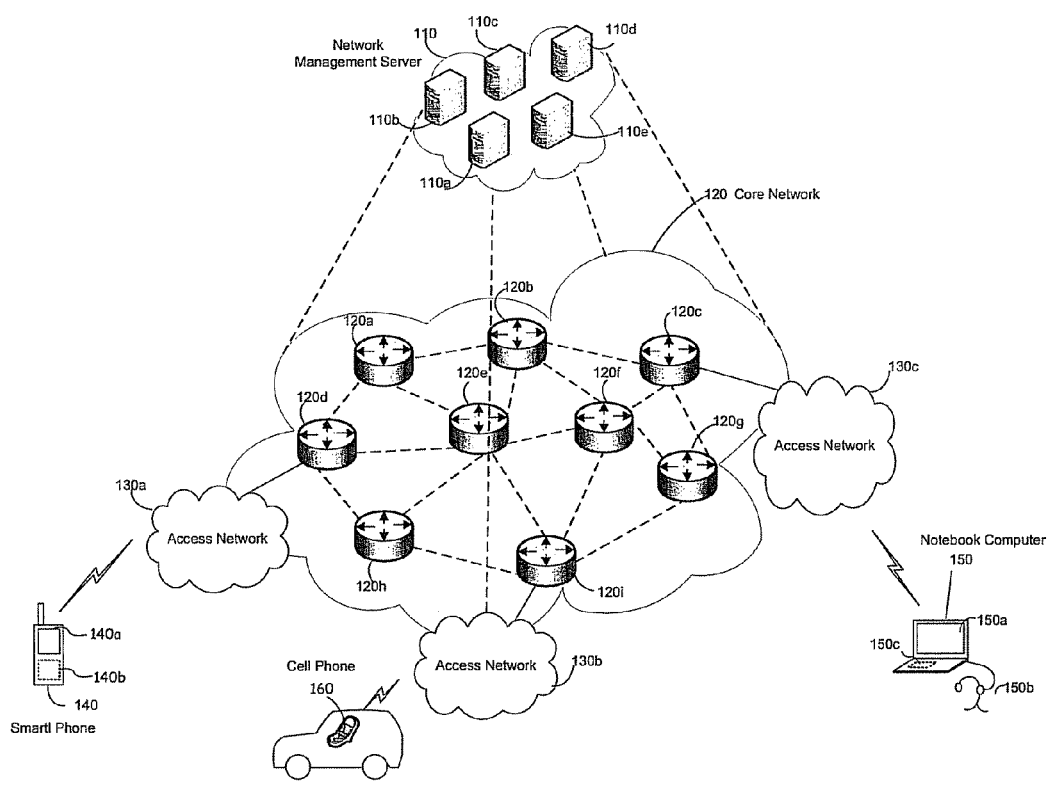
FIG. 1 is a block diagram illustrating an exemplary communication system that enables client QoS based connection session jogging, in accordance with an embodiment of the invention.

Certain embodiments of the invention may be found in a method and system for a client QoS based connection session jogging. In accordance with various embodiments of the invention, a service is initiated and supplied between a pair of user devices. There may be instances when a degraded service route in a supporting network causes a user of a user device to become dissatisfied with the quality of the received content presented on a user interface for the user device. In various embodiments of the invention, the user of the user device is provided with the capability to, for example, press or otherwise activate a jog button or speak to a microphone to request delivery of the content via an alternate route in the supporting network. Responsive to the activation of the jog button, the user device is operable to generate a request such as a connection handover (HO) request and transmit the request to a network management (NM) server that is coupled to the supporting network. Upon receiving the connection HO request, the NM server determines an alternate route and communicates determined alternate route information such as determined access router IP addresses with the user device and a peer user device, respectively. Upon the receipt of the updated route information from the NM server, the NM server delivers the service the user device over the determined alternate route. The connection HO request comprises session identification information associated with the degraded route, for example, a session ID associated with the degraded route. In the event that the NM server determines that the received session ID is an existing session ID stored at the NM server, the NM server selects the alternate route to continue the corresponding service. Depending on system configuration such as user device priority, the NM server determines the alternate route with or without communicating with the peer user device to confirm the received connection HO request. A connection session profile associated with the degraded route is updated at the NM server based on the determined alternate route information. The NM server delivers the service over the alternate route using the updated session profile.

The NM server supports a hard connection handoff or a soft connection handoff. In the event that the hard connection handoff is enabled, the NM server delivers the service over the determined alternate route subsequent to release of associated resources for the degraded route, while for a soft connection handoff, the NM server delivers the service over the determined alternate route prior to releasing associated resources for the degraded route. Moreover, the user of the user device is allowed to request a connection switch from the determined alternate route back to the degraded route. The connection HO request specifies a particular QoS for the delivery of the service. For example, the connection HO request indicates that a QoS better than currently provided is desired by the user.

FIG. 1 is a block diagram illustrating an exemplary communication system that enables a client QoS based connection session jogging, in accordance with an embodiment of the invention. Referring to FIG. 1, there is shown the system of FIG. 1 comprises a plurality of network management (NM) servers 110a-110e, which are collectively referenced as network management servers 110, a core network 120 comprising a plurality of routers 120a-120i, a plurality of access networks 130a-130c, and a plurality of clients, of which a smartphone 140, a notebook computer 150, and a cell phone 160 are illustrated. Each of the clients comprises a jog button such as 140b and 150c to be used for triggering connection session jogging based on client QoS experiences presented via a headset 150b and/or displays 140a, 150a, and/or 150b, respectively.

Each NM server 110 such as the NM server 110a comprises suitable logic, circuitry and/or code that are operable to manage various aspects of network communications such as, for example, selecting access network that a client such as the smartphone 140 uses to access the core network 120 and determining core network routes for forwarding various client packet streams toward intended recipients. The NM server 110a is configured to manage client registration and associated client locations. For example, in a mobile IP environment, the NM server 110a handles clients' available IP addresses and forwards client packet streams for each connection session using appropriate IP address notified by corresponding clients. Various client-server signaling messages such as QoS signaling messages are processed at the NM server 110a. For example, upon receiving a service request message from a client such as the smartphone 140, the NM server 110a is operable to select a route to form a connection between the smartphone 140 and an intended peer client such as the notebook computer 150.

A connection is a physical link which may be implemented via a series of routers over the selected route between the two clients. To enable communications over the connection, a session, which indicates a sequence of client-server interactions within a timeframe, is created by the NM server 110a. The NM server 110a generates a unique session ID for the created session and passes to the smartphone 140 and the notebook computer 150, respectively. An associated session profile of the created session comprises various session parameters such as, for example, type of service (ToS), session ID, addresses and ports, time of live. The session profile is stored at the NM server 110a for later use. Session parameters are primarily used to influence server operations. For example, the NM server 110a is operable to activate, maintain, update, and/or terminate the session per defined session parameters. In this regard, the NM server 110a is configured to activate the session at the service requests of associated clients such as the smartphone 140 and/or the notebook computer 150. In the event that users of the smartphone 140 and/or the notebook computer 150 are willing to make a connection jog, the NM server 110a is configured to determine whether one or more alternate routes are available. In instances where one or more alternate routes are available, the NM server 110a is enabled to select an alternate route from the one or more available routes and activate the session over the selected alternate route, accordingly. A session profile associated with the old route is updated with the selected alternate route information. The updated session profile is applied to the selected alternate route for continuation of the service. In addition, the NM server 110a is configured to swap the service back to the old route if desired by clients.

The core network 120 comprises suitable logic, circuitry and/or code that are operable to interface various access networks such as the access network 130a-130c with external data networks such as PDNs and the internet. There are a number of routers connected through links in the core network 120. Each router such as the router 120a comprises suitable logic, circuitry and/or code that are operable to forward packet streams to intended recipients. The router 120a is configured to exchange information such as link resource information for each link with one another. The link resource information comprises information of the resources available and information of the resources which have been reserved. Routers within the core network 120 are managed by the NM servers 110 in a unified way to allow easy and efficient maintenance thereof.

Various clients such as the notebook computer 150 comprise suitable logic, circuitry and/or code that enable various data communications via the access network 130a and/or the core network 120. The notebook computer 150 gains access to various services via the NM server 110a, for example. The notebook computer 150 is featured by using the jog button 150c to allow users of the notebook computer 150 to request a connection jogging based on user QoS experiences. For example, in the event that users of the notebook computer 150 are not satisfied with the QoS experiences over the display 150a and/or the headset 150c, the users are allowed to just activate the jog button 150c and signal the NM server 110a for an alternate route to continue the service. The notebook computer 150 is also operable to implement the associated function of the jog button 150c automatically by executing some software internally. In this regard, the notebook computer 150 is capable of requesting the alternate route for the service automatically based on corresponding QoS performances such as block error rate, packet dropping rate, and delay, on the notebook computer 150. Moreover, the notebook computer 150 is configured to allow the service to be swapped back to previous selected routes if desired.

In an exemplary operation, it is desirable for the smartphone 140 to communicate with the notebook computer 150 with specific QoS requirements. In this regard, the smartphone 140 issues a service request to the NM server 110a with the required QoS. The NM server 110a then selects a route comprising a pair of access routers such as the router 120d and the router 120c, and a series of intermediate routers such as the routers 120e-120i. The NM server 110a creates a session and generates associated session ID. The NM server 110a then informs or notifies the smartphone 140 and the notebook computer 150 of the generated session ID and corresponding access router addresses. When the session is active, packet streams of the service are forwarded over the selected route towards intended recipients. In the event that, for example, the user of the smartphone 140 is not satisfied with the quality of the received service presented on the display 140a, the user of the smartphone 140 then activates a jog feature, for example, by pressing the jog button 140b. The smartphone 140 then sends a signal to the NM server 110a to request connection jogging to achieve better user QoS experiences. In response, the NM server 110 re-evaluates the core network resources such as the current route assignments. In instances where the NM server 110 determines that there are no other available routes, the NM server 110 then rejects the received connection jogging request and signals the smartphone 140 for the rejection. Otherwise, the NM server 110 selects an alternate route for the requested service.

The NM server 110a is operable to update the session profile associated with the old route based on the selected alternate route information. The updated session profile is then applied to the selected alternate route to continue the session for the requested service. The NM server 110 maintains the session for the requested service without being stopped by route changes. In the event that the smartphone 140 user is still not satisfied with the QoS performance over the selected alternate route, the NM server 110a is allowed to swap the service back to the previous selected routes to continue the service to the smartphone 140 user by, for example, switching the service routing from the selected alternate route to a previous selected route.

Figure 2:
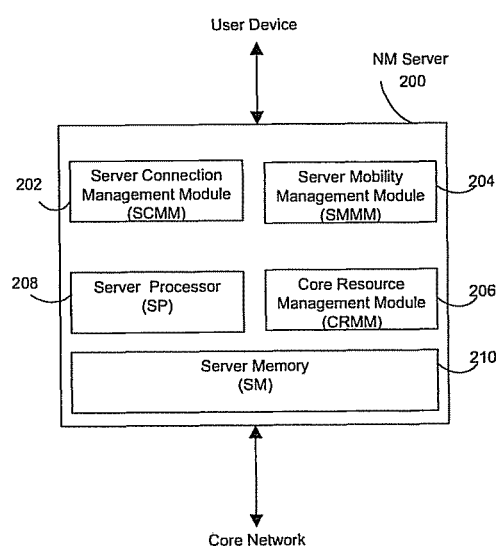
FIG. 2 is a block diagram illustrating an exemplary server device that is operable to enable client QoS based connection jogging, in accordance with an embodiment of the invention.

FIG. 2 is a block diagram illustrating an exemplary server device that is operable to enable a client QoS based connection jogging procedure, in accordance with an embodiment of the invention. Referring to FIG. 2, there is shown a NM server device 200 comprising a server connection management module (SCMM) 202, a server mobility management module (SMMM) 204, a core resource management module (CRMM) 206, a server processor (SP) 208, and a server memory (SM) 210.

The SCMM 202 comprises suitable logic, circuitry and/or code that are operable to monitor network connectivity and handle various connection session signaling messages with clients such as the smartphone 140 and the notebook computer 150. The connection session signaling messages comprises various service or QoS request messages. For example, upon the receipt of a QoS message from a client such as the smartphone 140 via the server processor (SP) 208, the SCMM 202 is configured to execute various operations related to admission control and route control by coordinating with the SMMM 204 and the CRMM 210. In this regard, the received QoS message is triggered by, for example, pressing the jog button 140a on the smartphone 140 due to the poor user QoS experiences. The SCMM 202 then evaluates network resource status from the CRMM 206 and selects an alternate route and/or access networks for requested service. The information on the selected alternate route and/or access networks are forwarded back to the SP 208 for further processing. The SCMM 202 is enabled to select the route by using various algorithms stored in the SM 210. For example, a route is selected by maximizing available bandwidth over the route, or by minimizing the number of routers or hops across the router. Routes may also be selected based on cost of the route. Since higher cost routes may guarantee higher QOS, the higher cost routes may be chosen over lower cost routes to ensure higher quality QOS. The SCMM 202 is operable to maintain and release various routes within the core network 120.

The SMMM 204 comprises suitable logic, circuitry and/or code that is operable to manage mobility information such as, for example, client addresses and client locations for the system of FIG. 1. The SMMM 204 is configured to handle mobility information via various client address mappings to ensure a seamless user experience. The mobility information is provided to the SCMM 202, the CRMM 206, and the SP 208 such that packet streams for each active session are transmitted to intended recipients notified by respective clients.

The CRMM 206 comprises suitable logic, circuitry and/or code that is operable to handle route resource information according to various QoS requirements and system capabilities. In the event that a resource request from the SCMM 202 is received by the CRMM 206, the CRMM 206 evaluates resource status of the core network 120. The CRMM 202 provides core resource information, such as status of routes with available resources in the core network 120, to the SCMM 202 to be used for various route selections.

The SP 208 comprises various types of processors or circuitry such as a microprocessor, a digital signal processor, an Application Specific Integrated Circuit (ASIC), or a combination of processing type devices. In this regard, the SP 208 may comprise suitable logic circuitry and/or code that is operable to execute a plurality of software instructions, which are stored in the server memory (SM) 210 and downloaded for execution. In this regard, the SP 208 is configured to calculate session IDs for various connection sessions using various algorithms stored in the SM 210. The SP 208 is operable to communicate various information such as, for example, the route selection information from the SCMM 202, with clients via the core network 120 and various access networks such as the access network 130a.

The SM 210 comprises suitable logic, circuitry, and/or code that are operable to enable storage of data and/or other information utilized by the NM server device 200. For example, the server memory 206 is utilized to store processed data generated by the SP 208. The SM 210 is also utilized to store information, such as client subscriber information and session profiles that is utilized to control various operations of the NM server device 200. The SM 210 is operable to store information necessary to enable or disable a particular service for a given user device. The server memory 206 is also operable to store some executable instructions for, for example, a connection session set-up, session profile update, and/or connection session re-establishment via re-using updated session profiles. The SM 210 comprises RAM, ROM, low latency nonvolatile memory such as flash memory and/or other suitable electronic data storage capable of storing data and instructions.

In operation, the NM server 200 receives a service request message from a client such as the smartphone 140. The service request message comprises information such as the associated QoS requirements of the requested service, candidates of access networks that the smartphone 140 uses, and an identity of an intended peer client such as the notebook computer 150. The SP 208 forwards the received service request information to the SCMM 202. The connection management 202 is enabled to communicate with the peer user device such as the user device 150 to confirm the service request. If the user device 150 agrees to communicate with the user device 140 for the requested service, then, the SCMM 202 coordinates with the SMMM 204 to gain mobility information for the related user devices. Then the SCMM 202 communicates with the CRMM 206 to determine whether there are routes with available resources in the core network 120. The CRMM 206 then provides the core resource information to the SCMM 202. The core network resource information may comprise information regarding network nodes (routers), network node memory, and/or the links. The SCMM 202 determines a core network route and/or access networks based on the core resource information.

The SP 206 generates a session ID for communicating packet streams of requested service between the two the smartphone 140 and the notebook computer 150. The generated session ID together with the selected access network information are passed to related user devices. In addition, associated session profile comprising various session parameters such as session ID and type of service is created and stored in the SM 210 to be used for later communication. In the event that the SP 208 receives a service request comprising an existing session ID stored in the SM 210, the SP 208 is operable to signal the SCMM 202 for selecting an alternate route for the corresponding service. The SCMM 202 determines the alternate route. The session profile associated with the existing session is updated based on the determined alternate route. The session is activated over the determined alternate route with the updated session profile.

Figure 3:
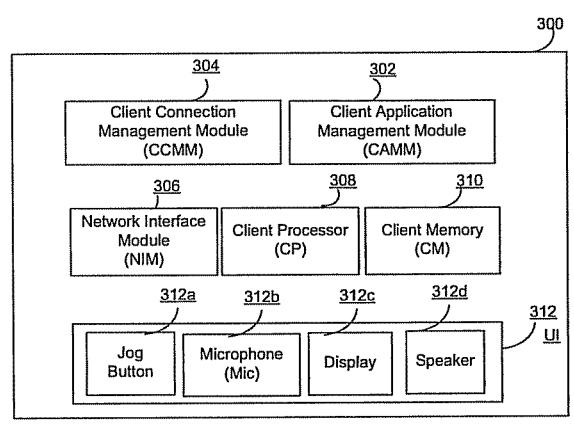
FIG. 3 is a block diagram illustrating an exemplary user device that is operable to enable client QoS based connection session jogging, in accordance with an embodiment of the invention.

FIG. 3 is a block diagram illustrating an exemplary user device that is operable to enable a client QoS based connection session jogging procedure, in accordance with an embodiment of the invention. Referring to FIG. 3, there is shown a user device 300 comprising a client application management module (CAMM) 302, a client connection management module (CCMM) 304, a network interface module (NIM) 306, a client processor (CP) 308, a client memory (CM) 310, and a user interface (UI) 312 comprising a jog button 312a, a microphone (Mic) 312b, a display 312c, and a speaker 312d.

The CAMM 302 comprises suitable logic, circuitry, and/or code that are operable to manage various application requirements and status. The various application requirements may comprise information regarding best user quality and QoS attributes. The application status indicates that, for example, the corresponding service is reserved and/or resumed. The CAMM 302 is also configured to monitor the fixed and variable port numbers used for identifying and monitoring application data.

The CCMM 304 comprises suitable logic, circuitry, and/or code that are operable to monitor network connectivity as well as, for example, the available bandwidth, transmission delay, and error rate of the connected access networks such as the access networks 130a-130c. The CCMM 304 is configured to handle various connection session signaling messages with the NM server 110a, for example, to access services with desired QoS, via the CP 308. The connection session signaling messages comprises various service or QoS request messages provided by the CAMM 302.

The NIM 306 comprises suitable logic, circuitry, and/or code that are operable to transmit and/or receive radio signals over an access network, which is communicatively coupled to the core network 120. The access network comprises a wired and/or wireless network. The communicated radio signals comprise information from the core network 120 which is managed via the NM servers 110.

The CP 308 comprises suitable logic, circuitry, and/or code that are enabled to control and/or handle data processing operations for the user device 300. The CP 308 is operable to process signals to communicate with a supporting communication network. In this regard, the signals comprise various service signaling messages such as a QoS request message. The user device 300 is operable to signal the NM server 110 for connection session establishment and/or re-establishment which enables transferring packet streams to intended recipients over the core network 120. In this regard, the CP 306 is configured to use various mechanisms such as execution of software stored in the CM 310 to identify a connection jogging request entered via the jog button 312a and/or the microphone 312b. The CP 306 then passes the identified connection jogging request to the NM server 110 via the NIM 306.

The user interface 312 comprises suitable logic, circuitry and/or code that is operable to service the user device 300 by enabling entry of user inputs and/or presentation of various interfaces to users of the user device 300. The user interface 312 comprises the jog button 312a, the microphone (Mic) 312b, the display 312c, the speaker 312d, and/or any other type of interface that is employed by the user device 300. In the event that a user of the user device 300 is not satisfied with received QoS from the display 312c and/or the speaker 312d, the user is allowed to trigger a connection jogging request by activating the jog button 312a and/or by using voice input via the microphone 312b.

The CM 310 comprises suitable logic, circuitry, and/or code that enable storage of data and/or other information utilized by the CP 308. For example, the CM 310 is utilized to store processed data generated by the CP 308. The CM 310 is operable to store information, such as user device configuration information, that is utilized to control various operations such as user-device interaction of the user device 300. Some software and/or code stored in the CM 310 are used to translate user input operations via the jog button 312a and/or the microphone 312b into identifiable triggering events to the CP 308 for issuing connection jogging requests to the NM server 110. For example, in the event that a user of the user device 300 is not satisfied with QoS experiences obtained via the user interface 312 such as the display 312c and/or the speaker 312d, the user is provided with the capability to activate or press the jog button 312a for a new connection session. Connection session information such as associated access router IP addresses and session ID received from the NM server 110 is stored in the memory 310. The CM 310 is operable to store some executable instructions for running various services on the user device 300.

In operation, in the event that the user device 300 wishes to communicate with a peer user device, the CAMM provides the CP 308 with client application requirements and/or a port number used to identify the client application data at the user device 300. Exemplary client application requirements comprise service type of the application and various QoS attributes such as bit rate and delay constrains associated with the application. The CCMM 304 is operable to communicate an identity of the peer device and IP address of a NM server such as the NM server 110a to the CP 308. The CP 308 then issues a service request to the NM server 110a via the NIM 306. The service request represents a request to initiate a session with the NM server 110a for a desired QoS comprising a desired data rate, latency, and error rate, with the peer device. Upon receiving a response via the NIM 306 from the NM server 110a, the CP 308 is operable to extract connection session information from the response and store in the CM 310. In instances where the received response indicates that a peer-to-peer connection session is established successfully, the CP 308 is enabled to communicate packet streams associated with the service through the NIM 306 according to the established connection session.

The content for received service is presented to the user via the user interface 312 such as the display 312c and/or the speaker 312d, respectively. In the event that the QoS presented via the display 312c and/or the speaker 312d is not satisfactory, the user is allowed to activate the jog button 312a and/or speak to the microphone 312b to request a connection jogging. The CP 308 identifies the connection jogging request by executing software and/or code stored in the CM 310 and forwards the connection jogging request to the NM server 110a via the NIM 306. Upon receipt of a corresponding response from the NM server 110a, the CP 308 updates the connection session information associated with the service based on the received response. The service continues utilizing the updated connection session. In instances where the user is not satisfied with the QoS with the updated connection session, the user is enabled to request a swap of the service back to a previous connection session by, for example, activation the jog button 312a. For example, the jog button 312a could he activated by holding it for an extended period of time or by activating it multiple times within a specified time period.

Figure 4:
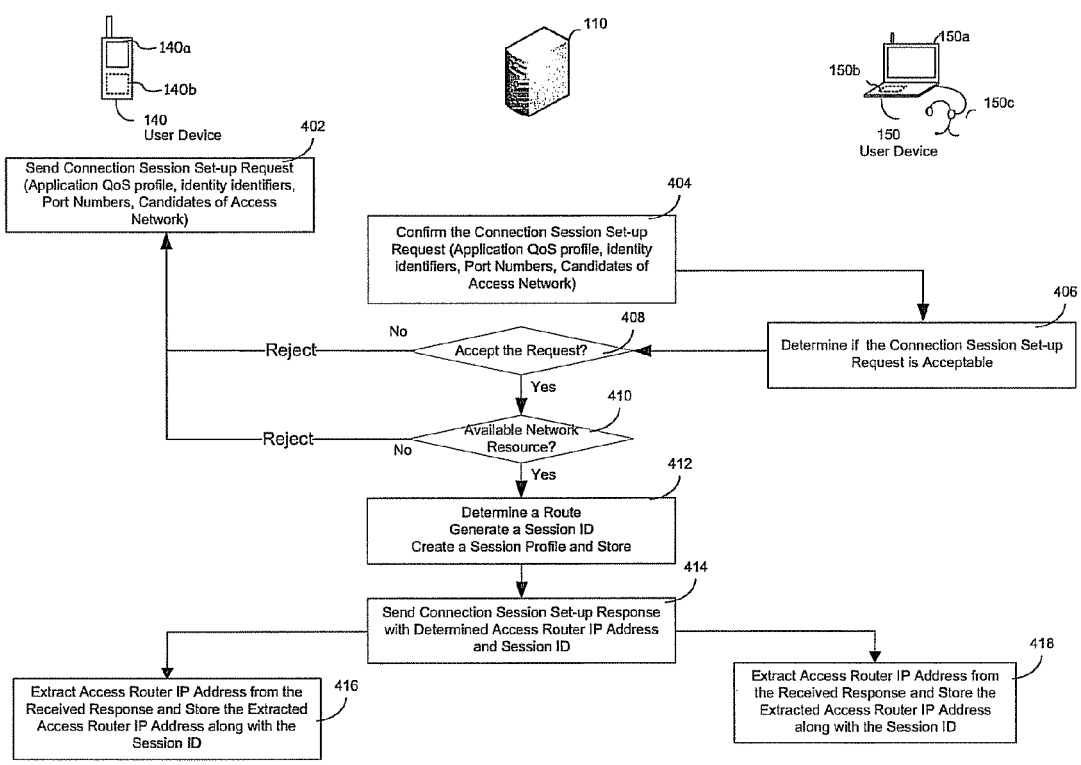
FIG. 4 is a flow chart illustrating an exemplary initial connection session set up, in accordance with an embodiment of the invention.

FIG. 4 is a flow chart illustrating an exemplary initial connection session set up, in accordance with an embodiment of the invention. Referring to FIG. 4, the exemplary steps start with the step 402, where it is desirable for a user device such as the smartphone 140 to set up a connection session with a peer user device such as the notebook computer 150. The smartphone 140 sends a connection session set-up request to the NM server 110a. The request comprises various information such as, for example, a client application QoS profile (client application requirements), identity identifiers such as IP address of the NM server 110a, port numbers used for identifying application data, and/or candidate access networks that the smartphone 140 uses.

In step 404, upon receiving the request, the NM server 110a communicates with the notebook computer 150 to confirm receipt of the received request. In step 406, the notebook computer 150 accepts the received request and informs the NM server 110a of the decision. In step 408, the NM server 110a is operable to determine whether the notebook computer 150 is willing to accept the request. In instances where the notebook computer 150 accepts the request, then in step 410, the NM server 110a is operable to determine whether there are available network resources in the core network 120 for the requested service. In instances where the NM server 110a determines that there are available resources in the core network 120 for the requested service, then in step 412, the NM server 110a determines a route, generates a session ID, and creates a session profile. The session profile may comprise the determined route information, the generated session ID, time-of-live, type-of-service, and/or QoS profile. The created session profile is stored in the SM 210.

In step 414, the NM server 110a is operable to signal the access router with the address and session ID to the smartphone 140 and notebook computer 150, respectively. In step 416, the smartphone 140 is operable to extract and the corresponding access router address and session ID from the received response message from the NM server 110a. In step 418, the notebook computer 150 extracts the corresponding access router address and session ID from the received response message from the NM server 110a and store. In step 408, in instances where the NM server 110a determines that the notebook computer 150 does not want to accept the request, then the NM server 110a is operable to send a rejection message to the smartphone 140. In step 410, in instances where the NM server 110a determines that there are no available resources for the request, the NM server 110a is operable to signal the smartphone 140 of the rejection.

Figure 5:
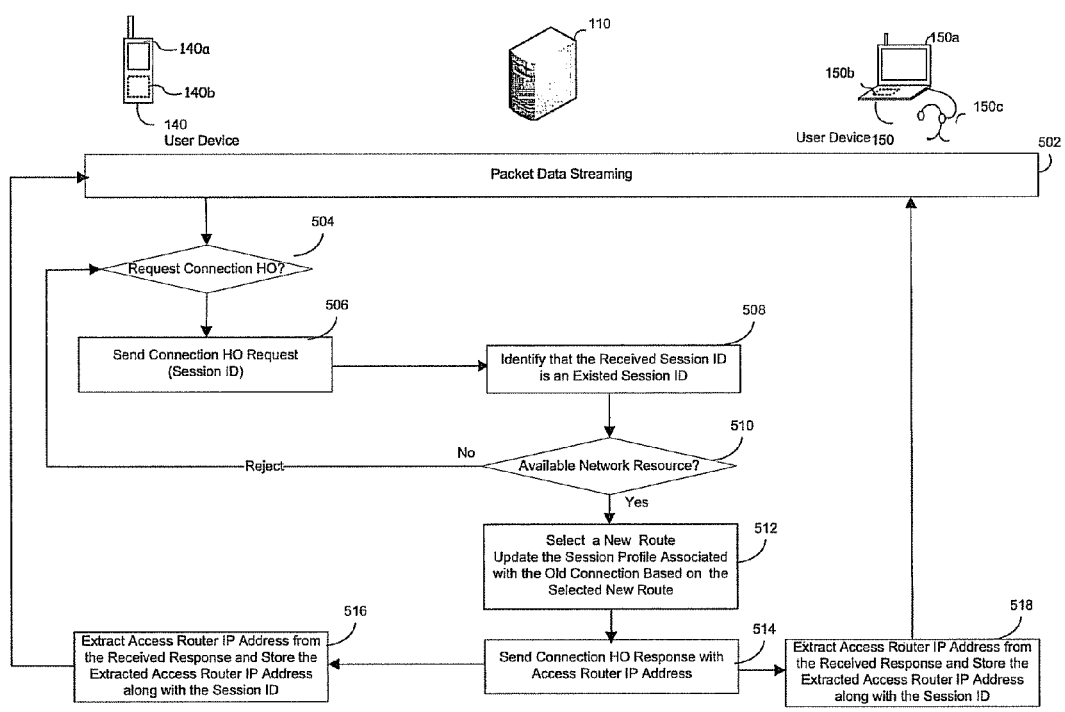
FIG. 5 is a flow chart illustrating an exemplary unsolicited connection session handoff initiation procedure, in accordance with an embodiment of the invention.

FIG. 5 is a flow chart illustrating an exemplary unsolicited connection session handoff initiation procedure, in accordance with an embodiment of the invention. Referring to FIG. 5, the exemplary steps start with the step 502, where the smartphone 140 are in an active connection session for packet data streaming with the notebook computer 150. The smartphone 140 is a master user device and the notebook computer is a slave user device. The smartphone 140 is operable to determine when a connection HO is needed based on user QoS experiences observed via a user interface such as the display 140a of the smart phone 140. In step 504, the smartphone 140 determines whether a connection jogging request is received via the jogging button 312a and/or the microphone 312b for requesting a connection handover (HO). In instances where the connection HO is requested, then in step 506, the smartphone 140 sends a connection HO request comprising, for example, current associated session ID, to the NM server 110.

In step 508, the NM server 110 identifies that the received session ID is an existing session ID stored in the SM 210. In step 510, the NM server 110 determines whether the core network 120 has available resources for the received connection HO request. In instances where network resources are available for the connection HO request, then in step 512, the NM server 110 selects a new route. The route related information in the session profile associated with the old connection is then updated based on the selected new route. In step 514, the NM server 110 sends a connection HO response with corresponding access router address to the smartphone 140 and the notebook computer 150, respectively. In step 516, the smartphone 140 extracts and stores the corresponding access router address along with the session ID in the CM 310. In step 518, the notebook computer 150 extracts and stores the corresponding access router address along with the session ID in the CM 310. The connection HO initiation procedure completes and the exemplary steps return to the step 502.

In step 510, in instances where the NM server 110a determines that there are no available resources for the request, the NM server 110a signals the smartphone 140 for the rejection.

Figure 6:
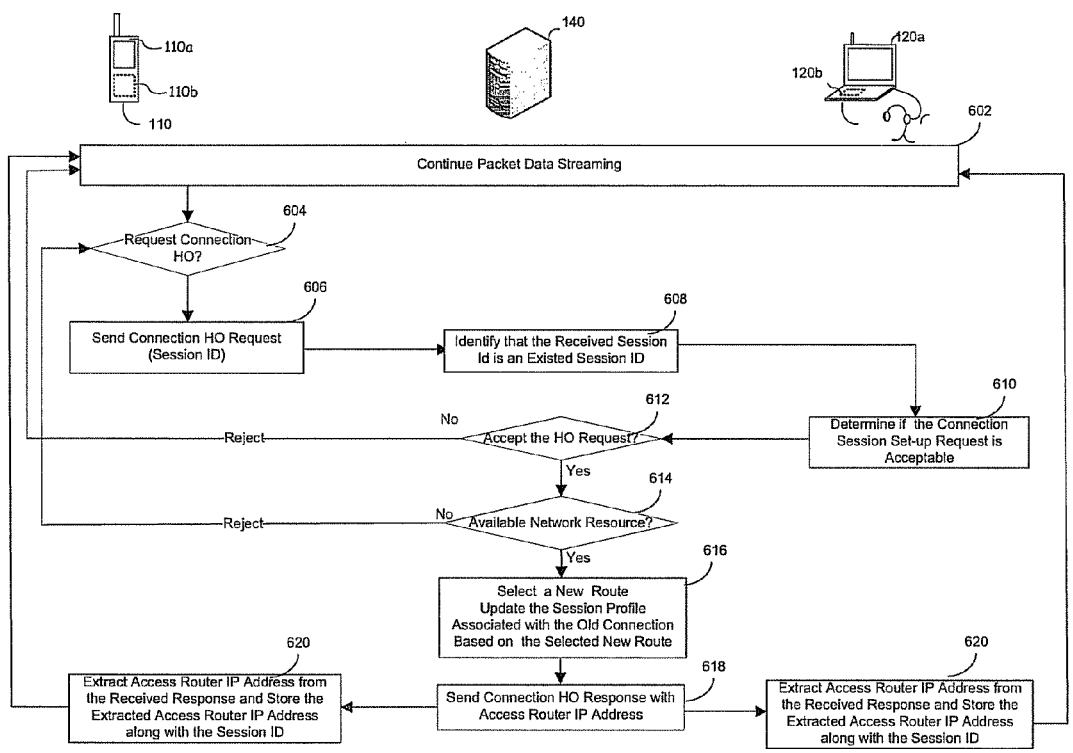
FIG. 6 is a flow chart illustrating an exemplary solicited connection session handoff initiation procedure, in accordance with an embodiment of the invention.

FIG. 6 is a flow chart illustrating an exemplary solicited connection session handoff initiation procedure, in accordance with an embodiment of the invention. Referring to FIG. 6, the exemplary steps start with the step 602, where the smartphone 140 are in an active connection session for packet data streaming with the notebook computer 150. The smartphone 140 and the notebook computer have the same priority level for requesting connection HO based on perspective terminal QoS. In step 604, a user device such as the smartphone 140 determines whether a connection jogging request is received via the jogging button 312a and/or the microphone 312b for requesting a connection handover (HO). In instances where the connection HO is requested, then in step 606, where the smartphone 140 sends a connection HO request comprising, for example, current associated session ID, to the NM server 110. In step 608, the NM server 110 determines that the received session ID is an existing session ID stored in the SM 210. In step 610, the notebook computer 150 determines whether the request will be accepted and notifies the NM server 110a of the decision. In step 612, the NM server 110 determines whether the core network 120 has available resources for the received connection HO request. In instances where network resources are available for the connection HO request, then in step 614, the NM server 110 selects a new route. The route related information in the session profile associated with the old connection is updated based on the selected new route. In step 616, the NM server 110 sends a connection HO response with corresponding access router IP address to the smartphone 140 and the notebook computer 150, respectively. In step 618, the smartphone 140 extracts and stores the access router IP address along with the session ID in the CM 310. In step 620, the notebook computer 150 extracts and stores the access router IP address along with the session ID in the CM 310. The connection HO initiation procedure completes and the exemplary steps return to the step 602.

In step 612, in instances where the NM server 110a determines that there are no available resources for the request, the NM server 110a signals or notifies the smartphone 140 of the rejection.

Figure 7:
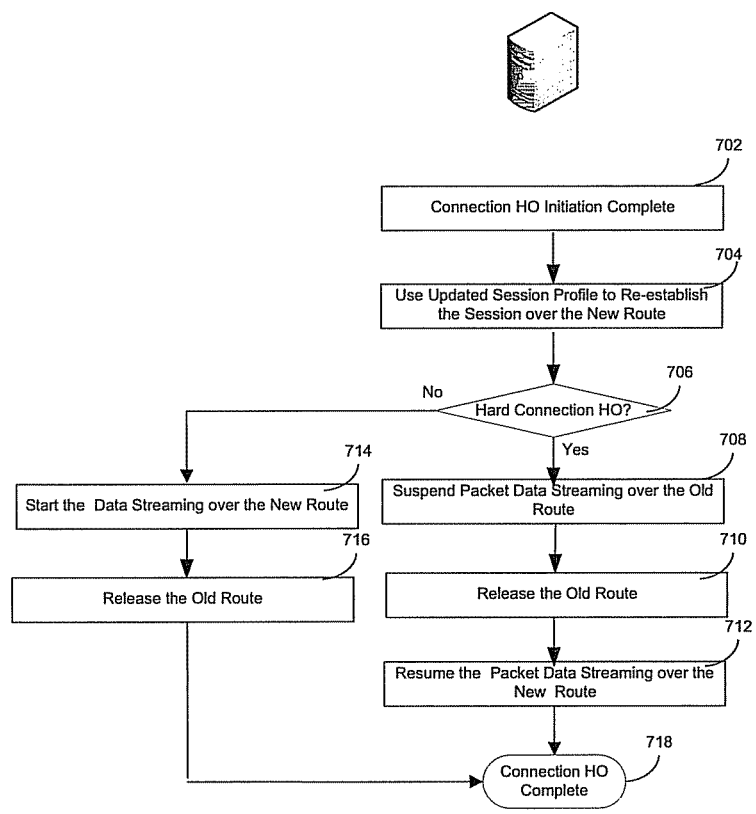
FIG. 7 is a flow chart illustrating an exemplary handoff execution procedure, in accordance with an embodiment of the invention.

FIG. 7 is a flow chart illustrating an exemplary handoff execution procedure, in accordance with an embodiment of the invention. Referring to FIG. 7, the exemplary steps start with the step 602, where the NM server 110 has completed a connection HO initiation as described with respect to FIG. 5 and FIG. 6, for example, In step 704, the NM server 110 uses the updated session profile to re-establish the session over the selected new route. In step 706, the NM server 110 determines whether a hard connection HO should be made. The hard connection HO is a connection HO scenario in which the session is resumed over the selected new route after the session is stopped over the old route. In instances where a hard connection handover is wanted, then in step 708, the packet data streaming over the old route is suspended. In step 710, the old connection is released. In step 712, the packet data streaming resumes over the new connection. The connection HO procedure completes in step 718. In step 706, in instances where a hard connection handover is not wanted, then in step 708, the packet data streaming over the old route is suspended. In step 714, the packet data streams starts over the new route. In step 716, resources for the old route are released. The connection HO procedure completes in step 718.

Figure 8:
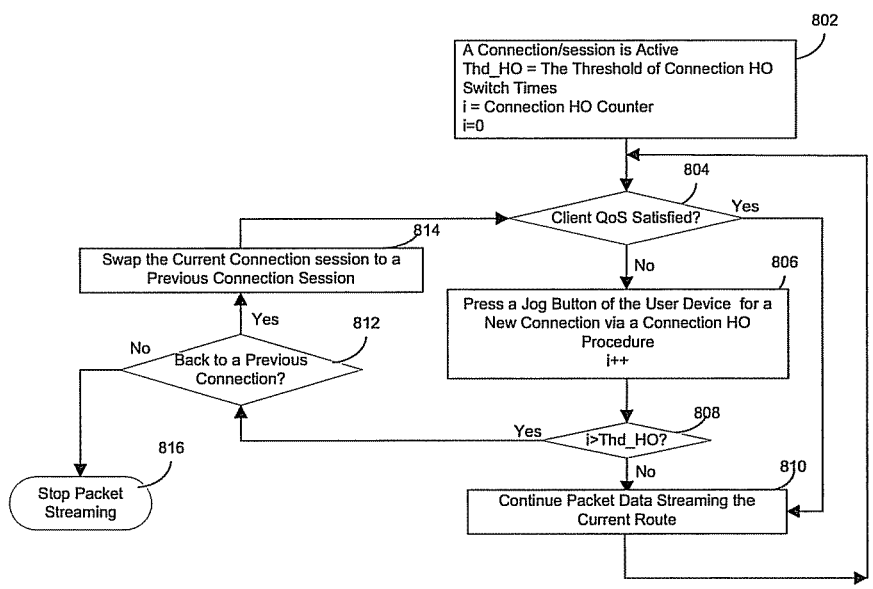
FIG. 8 is a flow chart illustrating an exemplary client QoS based connection jogging procedure, in accordance with an embodiment of the invention.

FIG. 8 is a flow chart illustrating an exemplary client QoS based connection jogging procedure, in accordance with an embodiment of the invention. Referring to FIG. 8, the exemplary steps start with the step 802, where a connection session between the smartphone 140 and the notebook computer 150 has been set up and active for packet data streaming of a service. The Thd_HO represents the threshold of connection HO switch times set for the service. The parameter i is a connection HO counter and initialized to i=0. In step 804, users of the user devices such as the smartphone 140 and the notebook computer 150 determine whether the terminal QoS, for example, observed on the display 140 and/or the display 150*a*, are satisfied. In instances where, for example, a user of the smartphone 140 is not satisfied with the terminal QoS of the received services presented on the display 140*a*, then in step 806, the user of the smartphone 140 activates or presses the jog button 140*b* for a new connection session via the connection HO procedure as described with respect to FIG. 5, FIG. 6, and FIG. 7, for example. The connection HO counter i is incremented by 1. In step 808, the NM server 110 determines if the i>Thd_HO. In instances where i is not greater than the Thd_HO, then in step 810, the packet data streaming and the exemplary steps return to step 804.

In step 804, in instances where the smartphone 140 is satisfied with the QoS of the content presented on the display 140*a*, then the exemplary steps continue in step 810. In step 808, in instances where i is greater than the Thd_HO, then in step 812, the NM server 110 is operable to determine whether the user devices are willing to use previous connection sessions. In instances where the associated user devices such as the smartphone 140 and/or the notebook computer 150 wishes to use a previous connection session to continue the service, then in step 814, the NM server 110 swaps the current connection session back to a previous connection session to continue the packet data streaming. The exemplary steps return to the step 804. In step 812, in instances where the smartphone 140 and/or the notebook computer 150 does not want to use a previous connection session to continue the service, then in step 816, the NM server 110 stops packet data streaming. The associated connection session is halted and the service between the smartphone 140 and the notebook computer 150 is suspended.

Aspects of a method and system for a client QoS based connection session jogging are provided. In accordance with various embodiments of the invention, a service is initiated and supplied between a user device such as the smartphone 140 and a peer user device such as the notebook computer 150. There may be instances when a degraded service route in a supporting network causes a user of the notebook computer 150 device to become dissatisfied with the quality of service of the received content presented via a user interface such as the display 150*a* and/or the headset 150*b*, The user of the notebook computer 150 is provided with the capability to, for example, press or otherwise activate the jog button 150*c* or speak to microphone to request deliver of the content via an alternate route in the core network 120. Responsive to the activation of the jog button 150*c*, the notebook computer 150 is operable to generate a request such as a connection handover (HO) request and transmit the request to the NM server 110, which is connected to the core network 120. Upon receiving the connection HO request, the NM server 110 determines an alternate route and communicates the determined alternate route information such as determined access router IP addresses to both the notebook computer 150 and the smartphone 140, respectively. Upon the receipt of the updated route information from the NM server 110, the NM server manages delivers the service to the notebook computer 150 over the determined alternate route. The connection HO request comprises session identification information associated with the degraded route, for example, a session ID associated with the degraded route. In the event that the NM server 110 determines that the received session ID is an existing session ID stored at the NM server 110, the NM server 110 selects the alternate route to continue the corresponding service. Depending on system configuration such as user device priority, the NM server 110 determines the alternate route with or without communicating with the smartphone 140 to confirm the received connection HO request as described in FIG. 6 and FIG. 5, respectively. A connection session profile associated with the degraded route is updated at the NM server 10 based on the determined alternate route information. The NM server 110 delivers the service over the alternate route using the updated session profile. The NM server 110 supports a hard connection handoff or a soft connection handoff. As described in FIG. 7, in the event that a hard connection handoff is enabled, the NM server 110 delivers the service over the determined alternate route subsequent to release of associated resources for the degraded route, while for a soft connection handoff, the NM server 110 delivers the service over the determined alternate route prior to releasing associated resources for the degraded route. Moreover, the users of the notebook computer 150 and/or the smartphone 140 are allowed to request a connection switch from the determined alternate route back to the degraded route. The connection HO request specifies a particular QoS for delivery of the service. For example, the connection HO request indicates that a QoS better than currently provided is desired by the user.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for client QoS based connection session jogging.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
   in a communication device that comprises communication interface circuitry, processing circuitry coupled to said communication interface circuitry, and a user interface coupled to said processing circuitry, wherein said communication device interacts with a remote device in a communication infrastructure that supports multiple possible communication pathways between said communication device and said remote device:
   initiating, by said processing circuitry, a data exchange over a first communication pathway of said multiple possible communication pathways, wherein said data exchange relates to at least a multimedia data delivery service;
   delivering, from said user interface, a jog input indication to said processing circuitry during said data exchange, wherein said jog input indication is generated by said user interface in response to an input from a user of said communication device, and said input from said user is indicative of dissatisfaction of said user with ongoing performance of said first communication pathway in said data exchange; and
   responding, by said processing circuitry, to said jog input indication received by switching said data exchange from said first communication pathway to a second communication pathway of said multiple possible communication pathways, wherein said switching is at least substantially seamless.

2. The method according to claim 1, comprising generating said jog input indication by said user interface via voice or touch.

3. The method according to claim 1, wherein said jog input indication comprises identification information of said first communication pathway.

4. The method according to claim 3, wherein said second communication pathway is determined based on identification information of said first communication pathway.

5. The method according to claim 1, wherein said second communication pathway is determined independently of any confirmation from said remote device.

6. The method according to claim 1, wherein said second communication pathway is determined based on a confirmation from said remote device.

7. The method according to claim 1, wherein a connection session profile associated with said first communication pathway is updated based on said second communication pathway.

8. The method according to claim 7, wherein said updated connection session profile is utilized for said data exchange over said second communication pathway.

9. The method according to claim 1, wherein content for said data exchange is delivered via said second communication pathway subsequent to release of associated resources for said first communication pathway.

10. The method according to claim 1, wherein content for said data exchange is delivered via said second communication pathway prior to releasing associated resources for said first communication pathway.

11. A system for communication, the system comprising:
    one or more processors or circuits for use in a communication device, said one or more processors or circuits comprising communication interface circuitry, processing circuitry coupled to said communication interface circuitry, and a user interface coupled to said processing circuitry, wherein said communication device interacts with a remote device in a communication infrastructure that supports multiple possible communication pathways between said communication device and said remote device, said one or more processors or circuits being operable to:
    initiate, by said processing circuitry, a data exchange over a first communication pathway of said multiple possible communication pathways, wherein said data exchange relates to at least a multimedia data delivery service;
    deliver from said user interface a jog input indication to said processing circuitry during said data exchange, wherein said jog input indication is generated by said user interface in response to an input from a user of said communication device, and said input from said user is indicative of dissatisfaction of said user with ongoing performance of said first communication pathway in said data exchange; and
    respond, by said processing circuitry, to said jog input indication received by switching said data exchange from said first communication pathway to a second communication pathway of said multiple possible communication pathways, wherein said switching is at least substantially seamless.

12. The system according to claim 11, wherein said one or more processors or circuits are operable to generate said jog input indication by said user interface via voice or touch.

13. The system according to claim 11, wherein said jog input indication comprises identification information of said first communication pathway.

14. The system according to claim 13, wherein said second communication pathway is determined based on identification information of said first communication pathway.

15. The system according to claim 11, wherein said second communication pathway is determined independently of any confirmation from said remote device.

16. The system according to claim 11, wherein said second communication pathway is determined based on a confirmation from said remote device.

17. The system according to claim 11, wherein a connection session profile associated with said first communication pathway is updated based on said second communication pathway.

18. The system according to claim 17, wherein said updated connection session profile is utilized for said data exchange over said second communication pathway.

19. The system according to claim 11, wherein content for said data exchange is delivered via said second communication pathway prior to releasing associated resources for said first communication pathway.

20. A method for communication, the method comprising:
in a communication device that comprises communication interface circuitry, processing circuitry coupled to said communication interface circuitry, and a user interface coupled to said processing circuitry, wherein said communication device interacts with a remote device in a communication infrastructure that supports multiple possible communication pathways between said communication device and said remote device:
initiating, by said processing circuitry, a data exchange over a first communication pathway of said multiple possible communication pathways, wherein said data exchange relates to at least a multimedia data delivery service;
delivering, from said user interface, a jog input indication to said processing circuitry during said data exchange, wherein said jog input indication is generated by said user interface in response to an input from a user of said communication device; and
responding, by said processing circuitry, to said jog input indication received by switching said data exchange from said first communication pathway to a second communication pathway of said multiple possible communication pathways.

* * * * *